United States Patent
Pezeshkpour et al.

(10) Patent No.: US 11,017,307 B2
(45) Date of Patent: May 25, 2021

(54) EXPLANATIONS GENERATION WITH DIFFERENT COGNITIVE VALUES USING GENERATIVE ADVERSARIAL NETWORKS

(71) Applicant: FUJITSU LIMITED, Kawasaki (JP)

(72) Inventors: Pouya Pezeshkpour, Irvine, CA (US); Ramya Malur Srinivasan, San Diego, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 16/278,609

(22) Filed: Feb. 18, 2019

(65) Prior Publication Data

US 2020/0125975 A1 Apr. 23, 2020

Related U.S. Application Data

(60) Provisional application No. 62/747,010, filed on Oct. 17, 2018.

(51) Int. Cl.
*G06N 5/04* (2006.01)
*G06N 3/04* (2006.01)
*G06K 9/62* (2006.01)
*G06N 7/00* (2006.01)
*G10L 13/10* (2013.01)
*G06F 40/56* (2020.01)

(52) U.S. Cl.
CPC .............. *G06N 5/045* (2013.01); *G06F 40/56* (2020.01); *G06K 9/628* (2013.01); *G06N 3/0454* (2013.01); *G06N 7/00* (2013.01); *G10L 13/10* (2013.01)

(58) Field of Classification Search
CPC ......... G06F 17/27; G06F 40/56; G06N 5/045; G06N 3/0454; G06N 7/00; G06K 9/628; G10L 13/10
USPC .......................................................... 704/9
See application file for complete search history.

(56) References Cited

U.S. PATENT DOCUMENTS

| 10,339,445 | B2 * | 7/2019 | Yang | ...................... G06N 3/082 |
| 10,360,470 | B2 * | 7/2019 | Yang | ...................... G06N 3/0454 |
| 10,366,328 | B2 * | 7/2019 | Yang | ...................... G06N 3/0454 |

(Continued)

OTHER PUBLICATIONS

Bau et al., Network Dissection: Quantifying Interpretability of Deep Visual Representations, CVPR Apr. 19, 2017, pp. 1-9.

(Continued)

*Primary Examiner* — Michael Colucci
(74) *Attorney, Agent, or Firm* — Maschoff Brennan

(57) ABSTRACT

A method of generating text having related purposes using a generative adversarial network (GAN) includes receiving a limited dataset including real data with related cognitive value types (types). The method includes applying loss functions to portions of the real data. The portions of the real data are each identified as having one of the types. The loss functions ensure alignment of the portions with corresponding types. The method includes embedding the real data into an encoder output that includes an embedded vector for the cognitive value types. The method includes generating an additional parameter set supplemental to the real data and configured to enhance an expressiveness of a model. The method includes generating statements based on the additional parameter set and the encoder output. The statements include a style of one of the cognitive value types and are related to a common issue addressed by the GAN.

20 Claims, 12 Drawing Sheets

(56) References Cited

U.S. PATENT DOCUMENTS

| | | | |
|---|---|---|---|
| 10,491,856 B2* | 11/2019 | Schroers | G06N 3/0454 |
| 10,565,499 B2* | 2/2020 | Bourdev | H04N 19/48 |
| 10,572,801 B2* | 2/2020 | Mars | G06N 3/0454 |
| 10,705,216 B2* | 7/2020 | Wang | G06N 3/08 |
| 10,860,919 B2* | 12/2020 | Kanazawa | G06T 7/194 |
| 2018/0293711 A1* | 10/2018 | Vogels | G06K 9/6267 |
| 2018/0357514 A1* | 12/2018 | Zisimopoulos | G06N 3/0472 |
| 2018/0365212 A1* | 12/2018 | Banerjee | H04L 67/36 |
| 2019/0028608 A1* | 1/2019 | Kang | H04N 1/4413 |
| 2019/0114348 A1* | 4/2019 | Gao | G06Q 30/0256 |
| 2019/0188260 A1 | 6/2019 | Hewitt | |
| 2019/0287230 A1* | 9/2019 | Lu | G06N 3/0454 |
| 2020/0019642 A1* | 1/2020 | Dua | G06N 3/0427 |
| 2020/0097554 A1* | 3/2020 | Rezagholizadeh | G06F 40/42 |

OTHER PUBLICATIONS

Chandrasekaran, et al., It Takes Two to Tango: Towards Theory of AI's Mind, arXiv, Oct. 2, 2017, pp. 1-21.

Chen et al., InfoGAN: Interpretable Representation Learning by Information Maximizing Generative Adversarial Nets, NIPS, Dec. 5, 2016, pp. 1-9.

Denton, et al., Deep Generative Image Models Using a Laplacian Pyramid of Adversarial Networks, arXiv Jun. 18, 2015, pp. 1-10.

Doshi-Velez, et al., Towards a Rigorous Science of Interpretable Machine Learning, ArXiv Mar. 2, 2017, pp. 1-13.

Fedus, et al., MaskGAN: Better Text Generation Via Filling in the ___, ICLR, Mar. 1, 2018, pp. 1-17.

Goodfellow, et al., Generative Adversarial Nets, NIPS, Jun. 10, 2014, pp. 1-9.

Gunning, Explainable Artificial Intelligence (XAI), Nov. 16, 2017, pp. 1-18.

Guo, et al., Long Text Generation Via Adversarial Training with Leaked Information, arXiv, Dec. 8, 2017, pp. 1-14.

Gurumurthy, et al., DeLiGAN: Generative Adversarial Networks for Diverse and Limited Data, arXiv, Jun. 7, 2017, pp. 1-9.

Heckel et al., Scalable and Interpretable Product Recommendations via Overlapping Co-Clustering, arXiv, Apr. 2017, pp. 1-13.

Hendricks, et al., Generating Visual Explanations, ECCV Mar. 28, 2016, pp. 1-17.

Hu, et al., Toward Controlled Generation of Text, ICML, Sep. 13, 2018, pp. 1-10.

Kocaoglu, et al., CausalGAN: Learning Causal Implicit Generative Models with Adversarial Training, ICLR Sep. 6, 2017, pp. 1-33.

Lombrozo, The Structure and Function of Explanations, TRENDS in Cognitive Sciences, vol. 10, No. 10, Aug. 2006, pp. 1-7.

Miller et al., Explainable AI: Beware of Inmates Running the Asylum, ArXiv Dec. 5, 2017, pp. 1-7.

Press, et al., Language Generation with Recurrent Generative Adversarial Networks without Pre-training, ArXiv Dec. 21, 2017, pp. 1-5.

Radford, et al., Unsupervised Representation Learning with Deep Convolutional Generative Adversarial Networks, ICLR, Jan. 7, 2016, pp. 1-16.

Rajeswar, et al., Adversarial Generation of Natural Language, ArXiv May 31, 2017, pp. 1-11.

Ribeiro, et al., Why Should I Trust You? Explaining the Predictions of Any Classifier, KDD Feb. 16, 2016, pp. 1-10.

Selvaraju, et al., Grad-CAM: Visual Explanations from Deep Networks via Gradient-based Localization, ArXiv Mar. 21, 2017, pp. 1-24.

Zhao, et al., Adversarially Regularized Autoencoders, ArXiv Jun. 29, 2018, pp. 1-16.

Rich Farmbrough, "Generative adversarial network", Wikipedia, Feb. 18, 2020.

EP Search Report in Application No. 19201897.6 dated Feb. 26, 2020.

Non-Final Office Action issued in corresponding U.S. Appl. No. 16/278,604 dated Jul. 27, 2020.

U.S. Office Action in U.S. Appl. No. 16/278,604 dated Dec. 28, 2020.

EP Office Action in Application No. 19 201 897.6 dated Feb. 9, 2021.

* cited by examiner

```
if    {NumTrades60Ever2DerogPubRec=0,MSinceMostRecentDelq=-7,NumBank2NatlTradesWHighUtilization=1} (rule[259]) then positive probability = 0.57723577 else if{MaxDelq2PublicRecLast12M=4,MSinceMostRecentInqexcl7days=0} (rule[2]) then positive probability = 0.21223022 else if {NumTrades60Ever2DerogPubRec=0,MSinceMostRecentDelq=-7,NumBank2NatlTradesWHighUtilization=0} (rule[274]) then positive probability = 0.66155321 else if {NumTrades90Ever2DerogPubRec=0,MSinceMostRecentDelq=-7,NumBank2NatlTradesWHighUtilization=0} (rule[413]) then positive probability = 0.80935507 else if {NumTrades90Ever2DerogPubRec=0,NetFractionInstallBurden=-8,NumBank2NatlTradesWHighUtilization=0} (rule[277]) then positive probability = 0.67857143 else if {MSinceMostRecentInqexcl7days=-7} (rule[154]) then positive probability = 0.28335950 else if {MSinceMostRecentInqexcl7days=0} (rule[166]) then positive probability = 0.30164371 else if{MaxDelq2PublicRecLast12M=6,NumBank2NatlTradesWHighUtilization=0} (rule[7]) then positive probability = 0.73989899 else (default rule) then positive probability = 0.46264368
```

FIG. 1

| | | |
|---|---|---|
| Real Sentences | There Is A Record Of Inconsisten Loan Payments | Please Reconsider Applying For A Loan Of A Different Amount That May Better Aling With Your Income |
| Unaligned GAN Model | Please Reconsider Applying For A Loan Of A Different Amount That May Better Align With Your Income | The Applicant Has Only Been Employed At Their Current Empolyer For A Limited Period Of Time |
| Unaligned GAN Model With The Additional Parameter Set | Talk To Your Bank About Finding Ways To Improve Your Credit | The Credit Associate With This Application Is, Unfortunately, Not High Enough To Be Considered Eligble For This Loan |
| Aligned GAN Model | Maintain A Consistent Record Of Timely Loan Payments Moving Forward | The Income Listed On This Application Is Not High Enough To Match The Amount Requested For A Loan |

EXPLANATIONS GENERATION WITH DIFFERENT COGNITIVE VALUES USING GENERATIVE ADVERSARIAL NETWORKS

CROSS REFERENCE TO RELATED APPLICATIONS

This application claims priority to and the benefit of U.S. provisional application 62/747,010 filed Oct. 17, 2018, which is incorporated herein by reference in its entirety. Additionally, this application is related to co-pending application entitled, "User-Friendly Explanation Production Using Generative Adversarial Networks," Ser. No. 16/278,604 filed Feb. 18, 2019 by Pouya Pezeshkpour, Ramya Malur Shrinivasan, and Ajay Chander, which is incorporated by reference in its entirety.

FIELD

The embodiments discussed herein are related to explanations generation with different cognitive values using generative adversarial networks.

BACKGROUND

Artificial intelligence (AI) modules may be implemented to make decisions in complex systems. Lay users, such as those who are not familiar with the inner workings of these complex systems or the parameters on which decisions are made by these systems, may not understand the outputs of AI modules. For instance, loan application systems may implement AI to process loan applications. Decisions regarding the loan applications may be determined by AI modules. However, current systems implementing the AI modules do not provide explanations of the decisions or explanations provided may be complicated and fail to provide an understandable explanation of the decisions.

Some AI modules may provide some details regarding an outputted decision. These details, however, are generally related to backend code or pseudocode that becomes visible to the user. These details fail to provide the understandable explanation that is comprehensible for a lay user. Moreover, the details may have a single purpose such as justification of the decision.

Additionally, AI modules generally rely on large data sets. Large data sets may include hundreds of thousands or millions of data showing parameters and outputs of a system. The large data sets are used to train and test machine-learning algorithms used in AI modules. Accordingly, it is difficult or impossible to generate efficient and functional AI modules in areas in which data sets are limited.

The subject matter claimed herein is not limited to embodiments that solve any disadvantages or that operate only in environments, such as those described. Rather, this background is only provided to illustrate one example technology area where some embodiments described herein may be practiced.

SUMMARY

According to an aspect of an embodiment, a method of generating text having two or more related purposes using a generative adversarial network (GAN) may include receiving a limited dataset that includes real data having two or more cognitive value types. The two or more cognitive value types may be related to one another. The method may include applying a first loss function to a first portion of the real data. The first portion of the real data may be identified as having a first cognitive value type of the two or more cognitive value types. The first loss function may be configured to ensure alignment of the first portion of the real data with the first cognitive value type. The method may include applying a second loss function to a second portion of the real data. The second portion may be identified as having a second cognitive value type of the two or more cognitive value types. The second loss function may be configured to ensure alignment of the second portion of the real data with the second cognitive value type. The method may include embedding the real data into an encoder output. The encoder output may include an embedded vector for each of the two or more cognitive value types. The method may include generating an additional parameter set. The additional parameter set may be supplemental to the real data and configured to enhance an expressiveness of a model. The method may include generating two or more statements based on the additional parameter set and the encoder output. Each of the two or more statements may have a style of one of the two or more cognitive value types. The two or more statements may be related to a common issue addressed by the GAN. The method may include converting the two or more generated statements to an audio output. The method may include communicating the audio output to a user during a network-based application interaction.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1 illustrates an example processing output;

FIG. 10 illustrates a table having some example statements that may be generated by the AI module of FIG. 3, all in accordance with at least one embodiment described herein.

DESCRIPTION OF EMBODIMENTS

Figure 2:
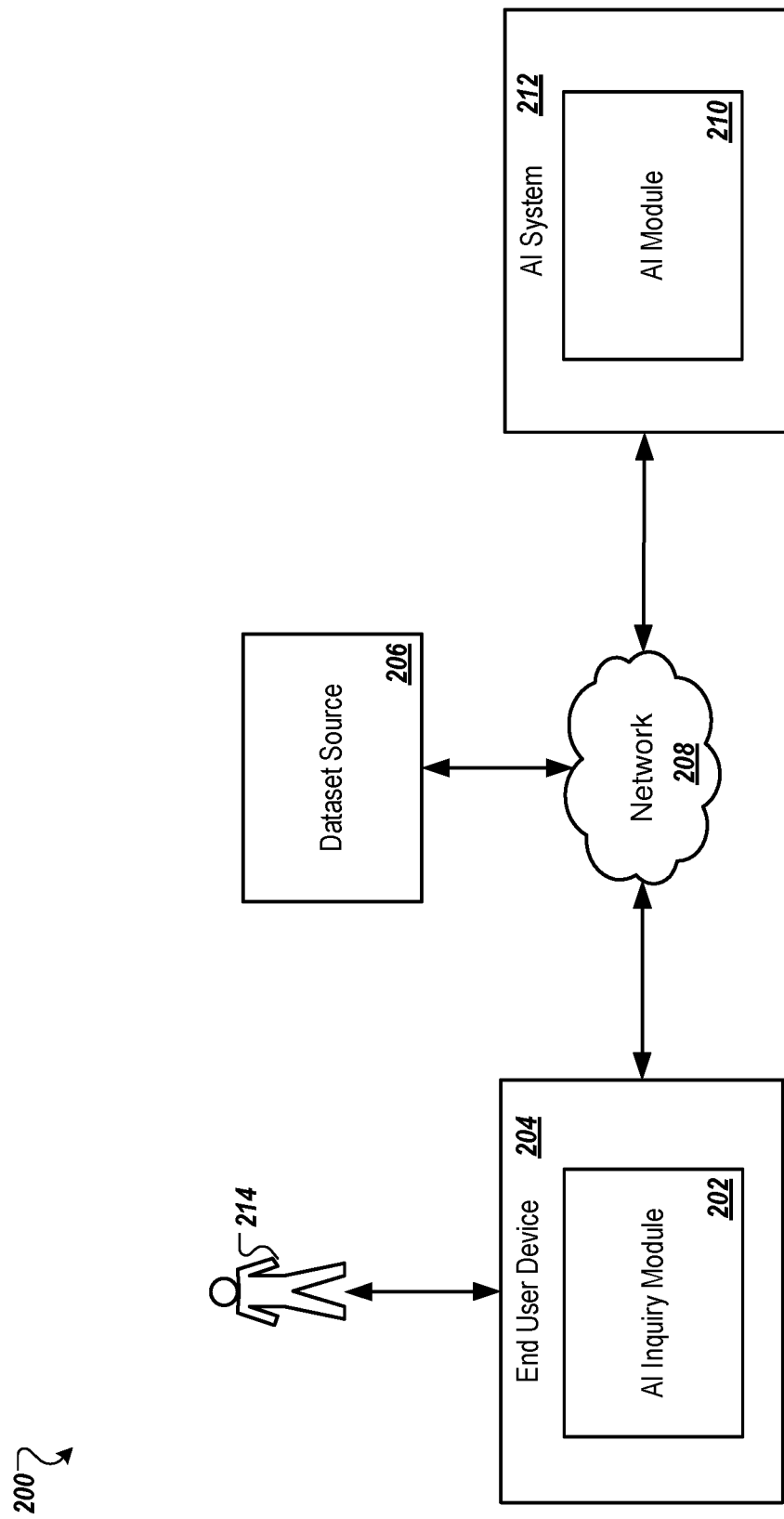
FIG. 2 illustrates a block diagram of an example operating environment.

Industries such as the financial institutions have begun developing and adopting artificial intelligence (AI) to progressively automate business processes. For instance, AI is used to predict customer behavior, verify identity for fraud detection, and intelligent chatbots that may be configured to answer customer queries. Additionally, AI may be employed in Fintech applications (e.g., technological-based banking applications and technology-based financial service applications).

Conventional AI systems may result in "black-box technologies" in which answers or decisions are provided to customers without an explanation and without any reasoning. In some systems, plain text answers or single-word decisions may be returned to a customer. However, the black-box technologies are unsuitable for certain applications. For instance, in healthcare applications, judicial applications, and some finance applications, the black box technology may be unsuitable. In particular, in these and other applications, a customer may request a complete answer and the customer interfacing with these or other applications may benefit from some additional reasoning, explanation, advice, etc., with a decision.

For example, Scalable Bayesian Rules Lists and LIME outputs may provide some backend processing to a user with a particular decision. An example of a processing output 100 is provided in FIG. 1. The example processing output 100 primarily relates to rules and pseudocode that is used in an AI process. The processing output 100 thus fails to properly explain a reason for a decision. Furthermore, the processing output 100 does not address any curative steps the user may take to help the AI module reach an alternative decision.

Additionally, some current systems that provide reasons for AI decisions utilize a large dataset to train AI models. The large datasets may include millions or tens of millions of data, for example. Large datasets are expensive to generate and access. Moreover, the large datasets used to train the AI models may contain features that are not necessarily understandable to lay or otherwise unsophisticated users. For instance, a loan application AI system may base decisions on external risk estimates, net fraction revolving burden, etc., which are complex parameters. Lay users may prefer explanations that include features that may not appear in the dataset of AI systems. It may be difficult to convert the parameters of the AI training data to features of an explanation that are understandable by the lay user. For instance, a lay user of a loan application system may be responsive to an explanation that is related to job history, background check, credit score, etc., and not to net fraction revolving burden, etc. However, to train the AI models to generate human-centered explanations, machine-learning algorithms may be implemented. Prior to implementation of the machine learning algorithms, the large dataset may be manually annotated. The manual annotation of the large dataset to generate human-centered explanations may be difficult and costly.

Accordingly, some embodiments of the present disclosure relate to a method for generating text or statements having related purposes from a limited dataset. The statements may be directed to two or more cognitive value types. The cognitive value types may include an educational information related to a decision. The cognitive value types may also include an action an end user may take to modify the reason. Further, the resulting text may be converted to voice thereby rendering a chatbot like application to an end-user.

The embodiments described in the present disclosure bridge and solve a current technological limitation that exists in AI modules and generation of datasets implemented to train and test machine learning algorithms in the AI modules. In particular, the embodiments described in the present disclosure address a technological gap between research and practice by effectively generating text that provides one or more user-friendly explanations. This text may cater to the needs of the wider community of users seeking explanations and may provide multiple explanations, which may serve different purposes.

In some embodiments, the dataset may be small. As used in the present disclosure, small is used to indicate sentences of about 2000 (e.g., about 2400) sentences/use cases and with fewer than about 100 unique reasons provided for a particular decision output of an AI module. The embodiments may be employed in circumstances having more or less than about 2000 sentences/use cases and more than or less than about 100 unique reasons. For instance, a number of sentences/use cases may be about 1000, 3000, 4000, 5000, 10000, 20000, or another suitable number. Additionally, a number of unique reasons may be 40, 50, 80, 120, 140, 300, 500, or another suitable number of unique reasons.

In some embodiments, a noise input may be modeled. For instance, the noise input may be modeled using a mixture of Gaussians. Loss functions may be applied to portions of real data of the limited dataset. The portions of the real data may each be identified as having one of the types. The loss functions ensure alignment of the portions with corresponding types. Multiple decoders may be implemented to evaluate the function of an encoder. For instance, in embodiments with two types, two decoders may be implemented, one for each type.

These and other embodiments are described with reference to the appended drawings. In the drawings, components and features with common item numbers have similar function and structure unless described otherwise.

FIG. 2 illustrates a block diagram of an example operating environment 200 arranged in accordance with at least one embodiment described in the present disclosure. The operating environment 200 may be configured for an interaction or an interface between an end user 214 and an artificial intelligence (AI) system 212. The interaction may include communication of information to the end user 214 via a communication network 208. The AI system 212 may be configured to generate and communicate statements related to the interaction or the interface based on a limited dataset. The statements may include related purposes and may have different cognitive value types (hereinafter, types). For instance, one of the statements may be related to an action to take to modify a decision provided by the AI system 212. A second, related statement may provide some educational information related to a reason for the decision. An example may be a first statement and may include some educational information as to a reason a loan is denied and a second statement may include an action for the end user 214 to take to obtain a loan (in a subsequent application).

The AI system 212 may include an AI module 210. The AI module 210 may be configured to generate or to include one or more adversarial networks, which are described elsewhere in the present disclosure. In particular, the AI module 210 may include a generative adversarial network (GAN), which may be implemented to generate statements having related purposes and/or different styles.

The AI module 210 represents a technical improvement to a technical problem in AI systems. For example, in current AI systems, training models to generate statements with related purposes requires large datasets with manual annotations. Manual annotation of the large datasets is costly. The AI module 210 utilizes a limited dataset. In particular, as described more below, the AI module 210 is configured to generate an additional parameter set to supplement the limited dataset. The additional parameter set enhances expressiveness of the statements. The additional parameter set may be generated using a mixture of Gaussians. Moreover, to improve the statements, loss functions may be applied as classifiers by the AI module 210. The classifiers may be configured to ensure portions of the limited dataset align with one of the types. Some examples of the operating environment 200 may include or may be implemented in an IT help desk (e.g., for software updates, patches, etc.), an enterprise application (e.g., for hiring decisions, productivity assessments, resource allocations, etc.), a financial decision system (e.g., loan denials, credit score assessment, interest rate evaluations, etc.), or another suitable application or system.

The operating environment 200 may include the AI system 212, an end user device 204, the AI module 210, an AI inquiry module 202, and the end user 214, some portion of which may communicate information and data via the communication network 208. Each of the components of the operating environment 200 is briefly described below.

The communication network 208 may be configured for communication of signals between any of the components of the operating environment 200. The communication network 208 may be wired or wireless. The communication network 208 may have numerous configurations including a star configuration, a token ring configuration, or another suitable configuration. Furthermore, the communication network 208 may include a local area network (LAN), a wide area network (WAN) (e.g., the Internet), and/or other interconnected data paths across which multiple devices may communicate. In some embodiments, the communication network 208 may include a peer-to-peer network. The communication network 208 may also be coupled to or include portions of a telecommunications network that may enable communication of data in a variety of different communication protocols.

The end user device 204 and/or the AI system 212 may include a hardware-based computing system. The end user device 204 and/or the AI system 212 may be configured to communicate with other components of the operating environment 200 via the communication network 208. The end user device 204 may include the AI inquiry module 202 that enables the end user 214 to interface with the AI system 212 using the end user device 204. The AI system 212 may include the AI module 210, which may be configured to receive inquiries from the end user device 204, generate the statements based thereon, and communicate the statements with the related purposes to the end user device 204 via the communication network 208.

The AI module 210, the AI inquiry module 202, and one or more components or modules thereof described throughout the present disclosure may be implemented using hardware including a processor, a microprocessor (e.g., to perform or control performance of one or more operations), a field-programmable gate array (FPGA), or an application-specific integrated circuit (ASIC). In some other instances, the AI module 210, the AI inquiry module 202, and one or more components or modules thereof may be implemented using a combination of hardware and software. Implementation in software may include rapid activation and deactivation of one or more transistors or transistor elements such as may be included in hardware of a computing system (e.g., the AI system 212 or the end user device 204). Additionally, software defined instructions may operate on information within transistor elements. Implementation of software instructions may at least temporarily reconfigure electronic pathways and transform computing hardware.

In some embodiments, the AI module 210 may be configured to generate text and/or statements having two or more related purposes. The AI module 210 may include a GAN, which may be configured to generate the text and/or statements. The AI module 210 may be configured to receive a limited dataset. The limited dataset may include real data, which may have two or more types. The two or more types may be related to one another.

The AI module 210 may be configured to apply a first loss function to a first portion of the real data. The first portion of the real data may be identified as having a first type of the two or more types. The first loss function may be configured to ensure alignment of the first portion of the real data with the first type.

The AI module 210 may be configured to apply a second loss function to a second portion of the real data. The second portion may be identified as having a second cognitive value type of the two or more cognitive value types. The second loss function may be configured to ensure alignment of the second portion of the real data with the second cognitive value type. The AI module 210 may be configured to embed the real data into an encoder output. The encoder output may include an embedded vector for each of the two or more types.

The AI module 210 may be configured to generate an additional parameter set. The additional parameter set may be supplemental to the real data and configured to enhance an expressiveness of a model. The AI module 210 may be configured to generate two or more statements based on the additional parameter set and the encoder output. Each of the two or more statements may have a style of one of the two or more cognitive value types. The two or more statements may be related to a common issue addressed by the GAN. The AI module 210 may convert the generated statement to an audio output. The AI module 210 may then communicate the audio output to the end user 214 during a network-based interaction.

Modifications, additions, or omissions may be made to the operating environment 200 without departing from the scope of the present disclosure. For example, the operating environment 200 may include one or more end user devices 204, one or more end users 214, one or more communication networks 208, one or more AI systems 212, or any combination thereof. Moreover, the separation of various components and servers in the embodiments described herein is not meant to indicate that the separation occurs in all embodiments. For example, the AI module 210 may be implemented locally in the end user device 204 and/or the AI inquiry module 202 may implement some of the functionality of the AI module 210 or the generative adversarial networks. Moreover, it may be understood with the benefit of this disclosure that the described components and servers may generally be integrated together in a single component or server or separated into multiple components or servers.

Figure 3:
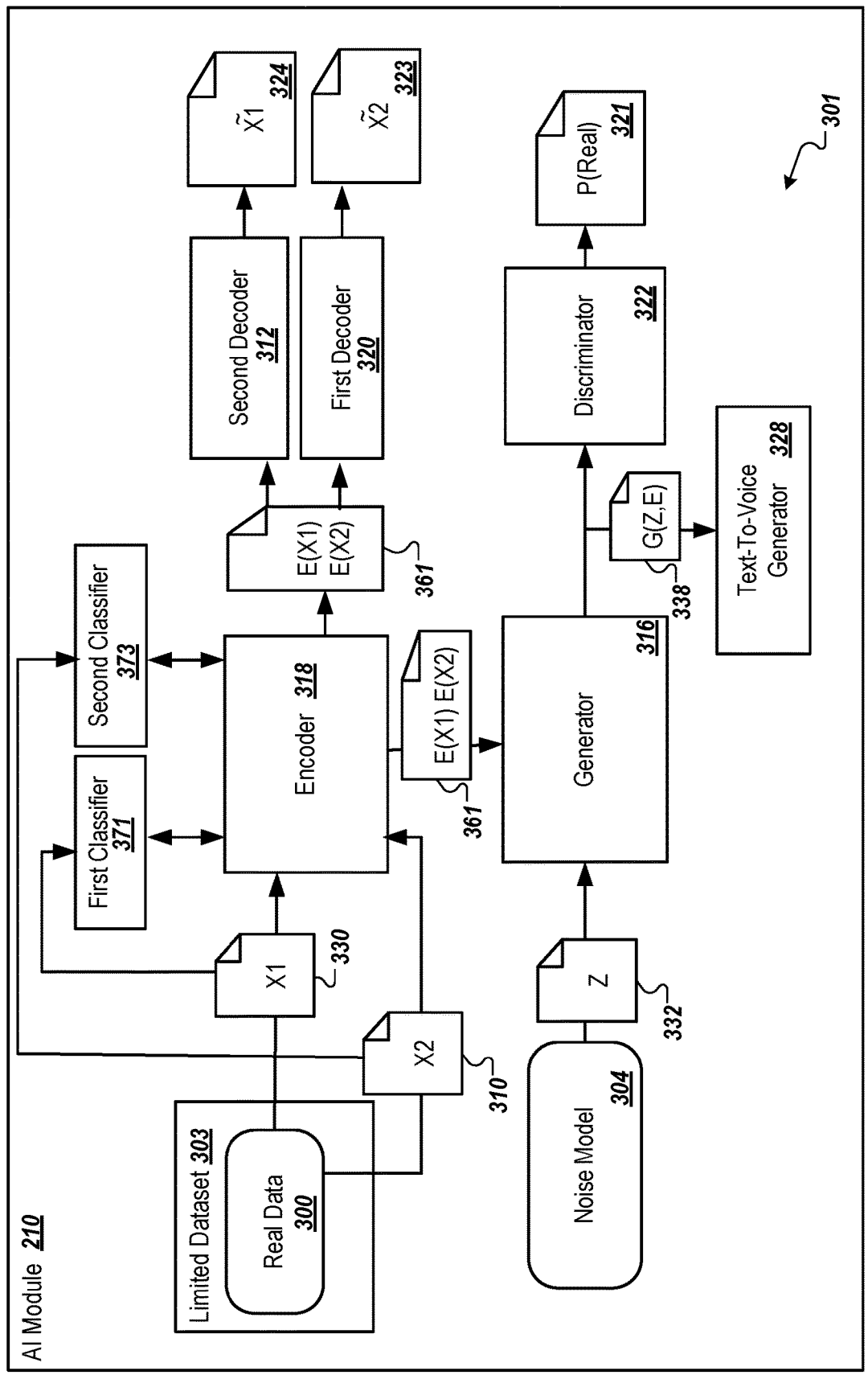
FIG. 3 illustrates an example embodiment of an artificial intelligence (AI) module that may be implemented in the operating environment of FIG. 2.

FIG. 3 illustrates an example embodiment of the AI module 210 according to at least one embodiment of the present disclosure. The AI module 210 of FIG. 3 includes a generative adversarial network (GAN) 301. The GAN 301 may be configured for generation of text and/or statements having different purposes from a limited dataset 303. The limited dataset 303 may include limited training data. The text generated by the GAN 301 may include different purposes. For instance, the text generated by the GAN 301 may include pairs of texts or statements. A first text may include educational information related to a reason for a decision of the AI module 210. A second may include information related to an action an end user may take to modify the decision or otherwise provide some insight into how to change or modify the decision.

The limited dataset 303 may include real data 300. The real data 300 may be received at the AI module 210 from a dataset source via a communication network. For instance, the real data 300 may be received from a dataset source 206 via the communication network 208. The real data 300 may include a dataset that is collected through use or implementation of an application, for instance. The real data 300 may include portions that have two or more types. The types may be related to one another. For instance, the real data 300 may include a first portion 330 (in FIG. 3, "X1" 330) and a second portion 310 (in FIG. 3, "X2" 310). The first portion 330 of the real data 300 may be identified as having a first type (or style). The second portion 310 of the real data 300 may be identified as having a second type (or style). The first portion 330 and/or the second portion 310 may be manually identified. For instance, a linguist or another suitable professional may manually identify the first portion 330 and the second portion 310 of the real data 300. In some embodiments, the types may include only a first cognitive value type and a second cognitive value type. In these and other embodiments, the limited dataset 303 may include pairs of explanations. A first explanation of each of the pairs of explanations may correspond to the first type. A second explanation of each of the pairs of explanations may correspond to the second type. The first explanation and the second explanation may both address a common issue identified in the real data 300.

Figure 6:
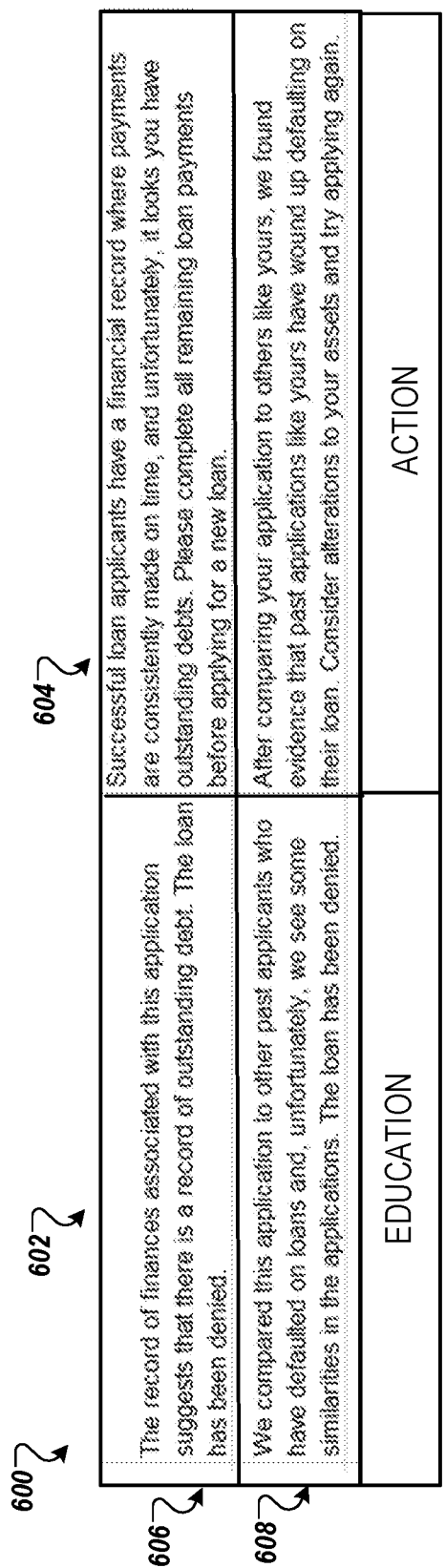
FIG. 6 depicts a table that includes a limited dataset that may be implemented in the AI module of FIG. 3.

For example, referring to FIG. 6, a table 600 of an example limited dataset is provided. A first portion 602 and a second portion 604 are included in the table 600. The first portion 602 includes sentences that are related to an educational value. The second portion 604 includes sentences that are related to an action value. In the rows, pairs 606 and 608 of sentences are included in the table 600. The pairs 606 and 608 are related to one another, and provide two styles of information. For instance, a first pair 606 is related to "outstanding debts" and how to cure the outstanding debts before reapplying for a loan. A second pair 608 is related to "defaulted loan" and how to reallocate assets before reapplying for a loan.

Referring back to FIG. 3, in some embodiments, the limited dataset 303 may include about 2000 sentence/user cases (e.g., about 2400 sentence/user cases) with fewer than about 100 unique reasons related to a particular decision output. In some embodiments, the particular decision output may describe an outcome regarding a loan application, an explanation concerning an information technology help desk, an explanation concerning an enterprise application, an explanation concerning a financial decision, some combination thereof, or another suitable application.

The real data 300 may include sentences, descriptions, use cases, reasons, or some combination thereof and may be manually edited and annotated. For example, in an example embodiment, the real data 300 may be collected by a group of workers such as Amazon Mechanical Turk (AMT) workers. The AMT worker provided textual descriptions highlighting reasons for loan denials. In this example embodiment, descriptions were edited for syntactic and semantic correctness. Further, linguists provided annotations for descriptions with a corresponding broad and specific reason. In this example embodiment, the real data 300 included a curated dataset of 2432 sentences with their corresponding reasons for loan denials.

The first portion 330 and the second portion 310 may be received by an encoder 318. In addition, the first portion 330 may be communicated to a first classifier 371 and the second portion 310 may be communicated to a second classifier 373. Each of the first classifier 371 and the second classifier 373 include a loss function. For example, a first loss function of the first classifier 371 may be applied to the first portion 330 of the real data 300. The first loss function may be configured to ensure alignment of the first portion 330 of the real data 300 with the first type. A second loss function of the second classifier 373 may be applied to the second portion 310 of the real data 300. The second loss function may be configured to ensure alignment of the second portion 310 of the real data 300 with the second type. In some embodiments, the first classifier 371 and the second classifier 373 may be similar to the loss functions described in Murat Kocaoglu et al. Causalgan: Leaning Causal Implicit Generative Models with Adversarial Training. arXiv preprint arXiv:1709.02023, 2017, which is incorporated by reference in its entirety.

The encoder 318 may be configured to embed at least portions of the real data 300. The encoder 318 may generate an encoder output 361. In some embodiments, the encoder output 361 may include an embedded vector for one or more of the types. The encoder output 361 may be communicated to a generator 316 and a first decoder 320 and a second decoder 312. The decoders 312 and 320 are configured to evaluate the encoder output 361 and to provide feedback to the encoder 318. The feedback may result in an alteration or modification of an operation of the encoder 318. In the embodiment of FIG. 3, there are two values, two classifiers 371 and 373, and the two decoders 312 and 320. In other embodiments, the GAN 301 may include more than two values, more than two classifiers, more than two decoders, or any combination thereof.

Figure 4:
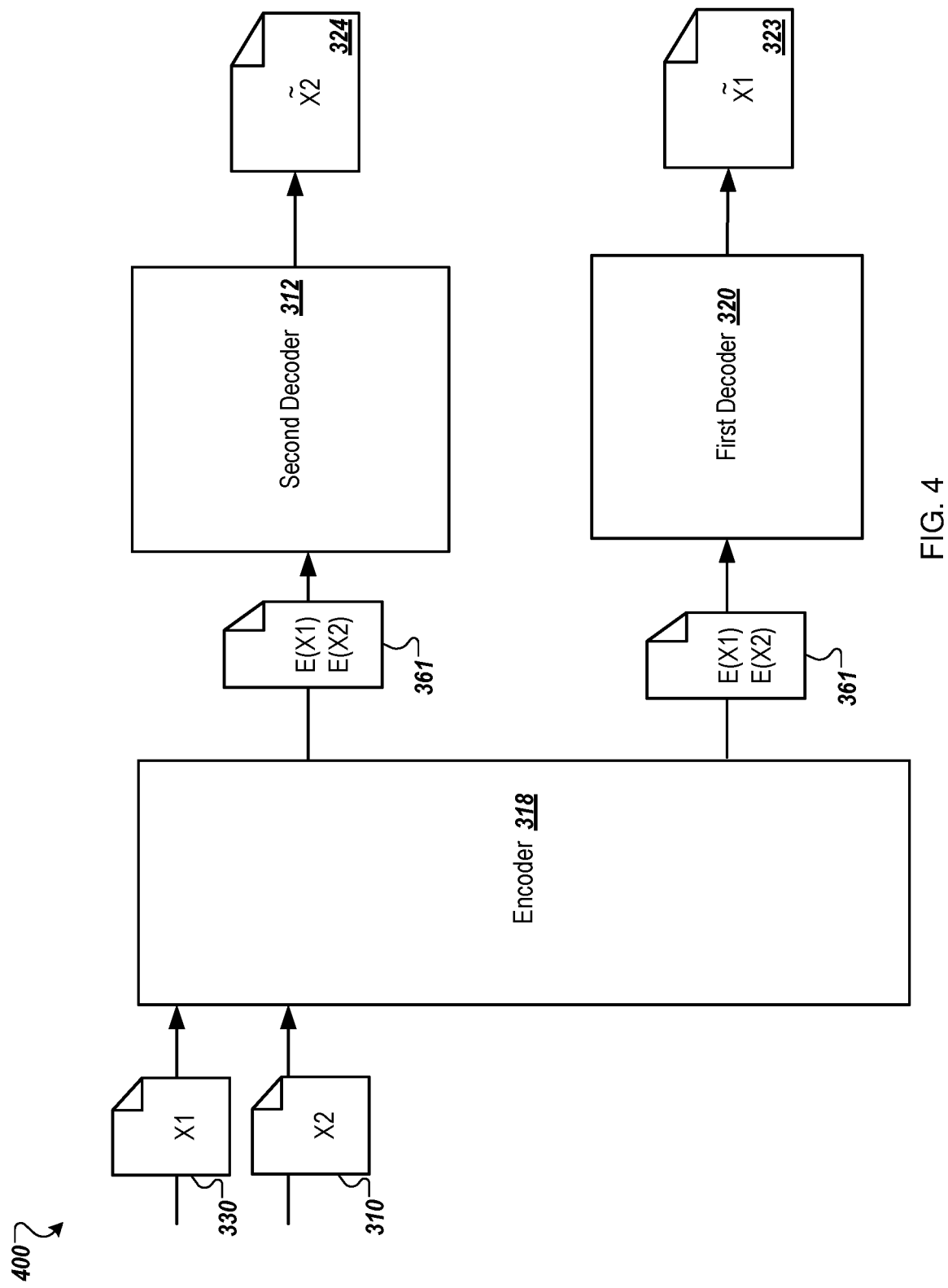
FIG. 4 illustrates an example encoder output evaluation process that may be performed by the AI module of FIG. 3.

Referring to FIG. 4, an example encoder output evaluation process 400 is depicted. The first portion 330 and the second portion 310 are received by the encoder 318. The encoder 318 may be configured to embed the first and second portions 330 and 310 into embedded vectors of an encoder output 361. The encoder output 361 may include a first embedded vector (in FIG. 4, E(X1)) and a second embedded vector (in FIG. 4, E(X2)). The first embedded vector and the second embedded vector may be received at the first decoder 320. The first embedded vector may correspond to the first portion 330 of real data 300 of FIG. 3. The second embedded vector "E(X2)" may correspond to the second portion 310 of the real data 300. The first decoder 320 may perform a reverse embedding process. The reverse embedding process may be performed to generate a first decoder output 323 (in FIG. 4, $\tilde{X}1$). The first decoder output 323 may be compared to the first portion 330. Responsive to a mismatch between the first decoder output 323 and the first portion 330, an operation of the encoder 318 may be altered. Responsive to a match between the first decoder output 323 and the first portion 330, operations of the encoder 318 may be maintained.

Similarly, the first embedded vector and the second embedded vector may be received at the second decoder 312. The second decoder 312 may perform the reverse embedding process to generate a second decoder output 324 (in FIG. 4, $\tilde{X}2$). The second decoder output 324 may be compared to the second portion 310. Responsive to a mismatch between the second decoder output 324 and the second portion 310, an operation of the encoder 318 may be altered. Responsive to a match between the second decoder output 324 and the second portion 310, operations of the encoder 318 may be maintained.

Referring back to FIG. 3, the GAN 301 may be configured to enhance expressiveness. For instance, the GAN 301 may enhance expressiveness through use of a noise model 304. The noise model 304 may model or generate noise input, which may include an additional parameter set that may supplement the limited dataset 303. In FIG. 3, the additional parameter set and the noise input is represented by "Z" 332. The noise input 332 (also the additional parameter set) may be modeled as a mixture of Gaussians.

Figure 5:
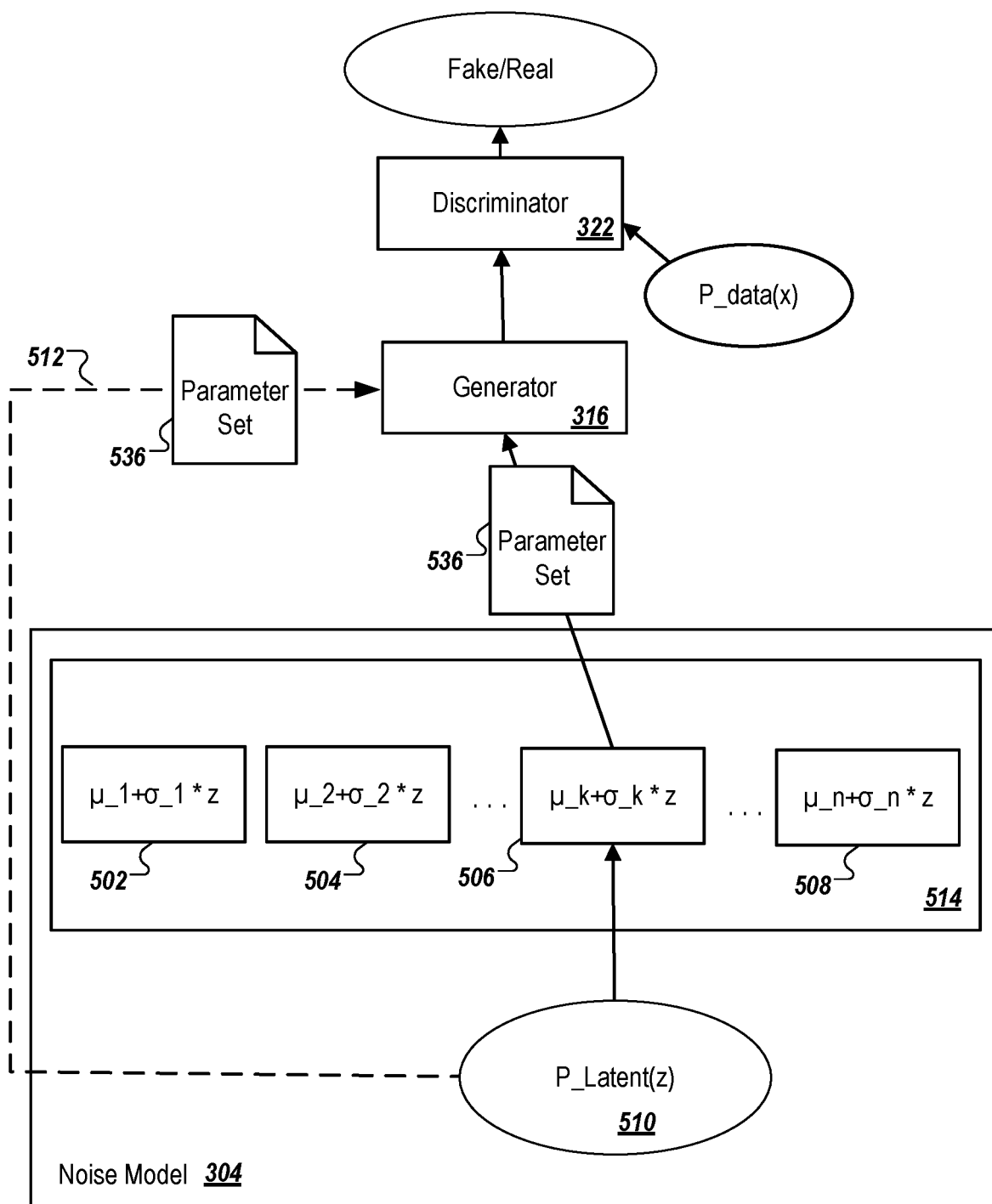
FIG. 5 illustrates an example noise module that may be implemented in the AI module of FIG. 3.

Referring to FIG. 5, a detailed view of an example embodiment of the noise model 304 is depicted. The noise model 304 is based on the Diverse and Limited GAN (referred to as a DeLiGAN) developed in Swaminathan Gurumurthy, Ravi Kiran Sarvadevabhatla, and R Venkatesh Babu. Deligan: Generative Adversarial Networks For Diverse And Limited Data. In CVPR, pages 4941-4949, 2017, which is incorporated by reference in its entirety.

The noise model 304 of FIG. 5 is depicted with the generator 316 and a discriminator 322 described elsewhere in the present disclosure. The noise model 304 may be configured to generate an additional parameter set 536 (in FIG. 5, "parameter set 536). The parameter set 536 may include one or more additional parameters and one or more additional statements. The parameter set 536 is configured to supplement the real data 300 of FIG. 3 and configured to enhance expressiveness. For instance, as described above, the real data 300 may be based on a limited dataset. The limited dataset may include about 2000 sentence/use-cases and about 100 unique reasons. The limited dataset may be insufficient to model and train a GAN such as the GAN 301 of FIG. 3. Accordingly, the parameter set 536 may increase a number of sentence/use-cases and/or number of unique reasons.

The noise model 304 may implement a mixture of Gaussians 502, 504, 506, and 508, which are included in a Gaussian set 514. The Gaussian set 514 may be implemented with simple latent distribution 510. A latent space is reparametrized using the Gaussian set 514. One of the Gaussian set 514 is randomly selected to generate the parameter set 536. In FIG. 5, a third Gaussian 506 is selected. In the Gaussians 502, 504, 506, and 508, z represents a deterministic function that is based on the particular Gaussian randomly selected and parameters σ and μ described in Gurumurthy referenced above. The variables k and n are indexing variables.

In some embodiments, the noise model 304 may bypass the Gaussian set 514. For instance, in FIG. 5, the parameter set 536 may be generated based on simple latent distribution 510. This operation is shown by dashed line 512.

Referring back to FIG. 3, the generator 316 may use the additional parameter set 332 of the noise model 304 with the encoder output 361 from the encoder 318 to generate statements. The statements may be incorporated in a sentence with one or more difference purposes. The statements are represented by "G(Z,E)" which is labelled "338" in FIG. 3. The parameter "G" indicates a function of the additional parameter set from the noise model 304 and the encoder output 361. The statements 338 may be communicated to the discriminator 322 and a text-to-voice generator 328.

Referring to FIG. 10, a table 1000 that includes some example statements with two purposes depicted. In the table 1000, a first column 1002 indicates which portions of the GAN 301 are included that resulted in corresponding statements in a second column 1004 and a third column 1006. For instance, real sentences relates to the limited dataset 303. A corresponding pair of data (which would be related to a first portion 330 and a second portion 310) includes two related statements, each having a purpose or type. A second row includes an unaligned GAN model that may omit the classifiers 371 and 373 and the noise model 304. A third row includes an unaligned GAN model that may omit the classifiers 371 and 373. A fourth row includes an aligned GAN model similar to that shown in FIG. 3.

Referring back to FIG. 3, the discriminator 322 in the GAN 301 may be configured to provide some assurance that the generator 316 is generating accurate, synthetic data. The discriminator 322 may give the signal to the generator 316 that the statements output from the generator 316 are "good" or "bad." For example, the discriminator 322 may output a binary signal to the generator 316 as feedback. Based on the feedback, the generator 316 may evolve and get better over the course of time. In summary, the discriminator 322 may be configured to indicate to the generator 316 whether the statements output from the generator 316 are good or bad.

The discriminator 322 of FIG. 3 may generate a probability 321 that one of the statements is real. For instance, in FIG. 3 the "P" stands for probability. The P(real) indicates a probability of whether the statement corresponds to "real data." The feedback to the generator 316 may be based on the probability 321.

In some embodiments, the encoder 318, the decoders 312 and 320, the generator 316, and discriminator 322 may be consistent with an adversarially regularized autoencoder GAN (ARAEGAN) architecture. Some additional details of the ARAEGAN architecture may be found in "Adversarially Regularized Autoencoders for Generating Discrete Structures, Junbo et. al., ICML PMLR 2018, which is incorporated herein by reference in its entirety.

The text-to-voice generator 328 may receive the statements 338 output by the generator 316. The text-to-voice generator 328 may be configured to generate an audio signal based on and representative of the statements 338. The text-to-voice generator 328 may be used to generate a chatbot that talks to an end user. For instance, with reference to FIGS. 2 and 3. An audio signal may be communicated to the end user device 204 via the communication network 208.

Figure 7:
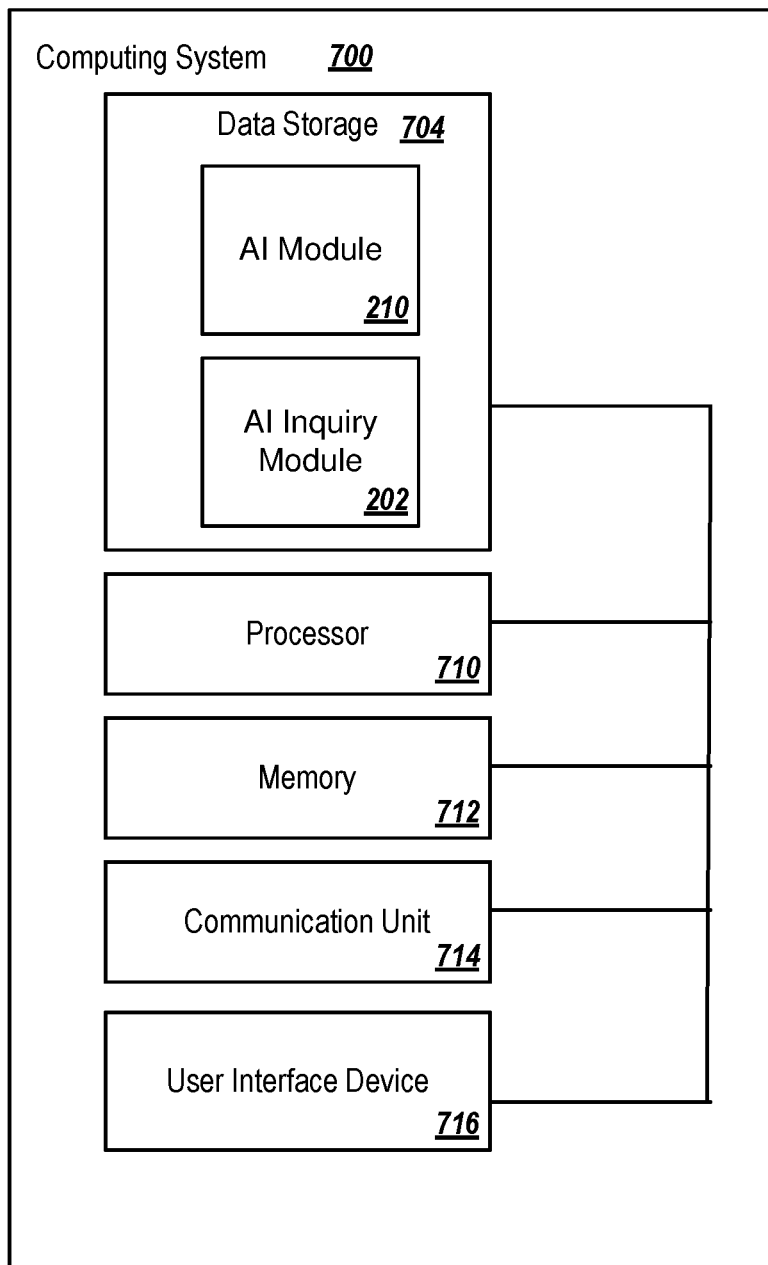
FIG. 7 is a block diagram of an example computing system that is configured for generation of text having two or more purposes.

FIG. 7 illustrates an example computing system 700 configured for text generation having two or more related purposes according to at least one embodiment of the present disclosure. The computing system 700 may be implemented in the operating environment 200 of FIG. 2, for instance. Examples of the computing system 700 may include the end user device 204 or the AI system 212. The computing system 700 may include one or more processors 710, a memory 712, a communication unit 714, a user interface device 716, and a data storage 704 that includes the AI module 210 and the AI inquiry module 202 (collectively, modules 210/202).

The processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 7, the processor 710 may more generally include any number of processors configured to perform individually or collectively any number of operations described in the present disclosure. Additionally, one or more of the processors 710 may be present on one or more different electronic devices or computing systems. In some embodiments, the processor 710 may interpret and/or execute program instructions and/or process data stored in the memory 712, the data storage 704, or the memory 712 and the data storage 704. In some embodiments, the processor 710 may fetch program instructions from the data storage 704 and load the program instructions in the memory 712. After the program instructions are loaded into the memory 712, the processor 710 may execute the program instructions.

The memory 712 and the data storage 704 may include computer-readable storage media for carrying or having computer-executable instructions or data structures stored thereon. Such computer-readable storage media may include any available media that may be accessed by a general-purpose or special-purpose computer, such as the processor 710. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 714 may include one or more pieces of hardware configured to receive and send communications. In some embodiments, the communication unit 714 may include one or more of an antenna, a wired port, and modulation/demodulation hardware, among other communication hardware devices. In particular, the communication unit 714 may be configured to receive a communication from outside the computing system 700 and to present the communication to the processor 710 or to send a communication from the processor 710 to another device or network (e.g., 208 of FIG. 2).

The user interface device 716 may include one or more pieces of hardware configured to receive input from and/or provide output to a user. In some embodiments, the user interface device 716 may include one or more of a speaker, a microphone, a display, a keyboard, a touch screen, or a holographic projection, among other hardware devices.

The modules 210/202 may include program instructions stored in the data storage 704. The processor 710 may be configured to load the modules 210/202 into the memory 712 and execute the modules 210/202. Alternatively, the processor 710 may execute the modules 210/202 line-by-line from the data storage 704 without loading them into the memory 712. When executing the modules 210/202, the processor 710 may be configured to perform a participation verification process as described elsewhere in this disclosure.

Modifications, additions, or omissions may be made to the computing system 700 without departing from the scope of the present disclosure. For example, in some embodiments, the computing system 700 may not include the user interface device 716. In some embodiments, the different components of the computing system 700 may be physically separate and may be communicatively coupled via any suitable mechanism. For example, the data storage 704 may be part of a storage device that is separate from a server, which includes the processor 710, the memory 712, and the communication unit 714, that is communicatively coupled to the storage device. The embodiments described herein may include the use of a special-purpose or general-purpose computer including various computer hardware or software modules, as discussed in greater detail below.

Figure 8A:
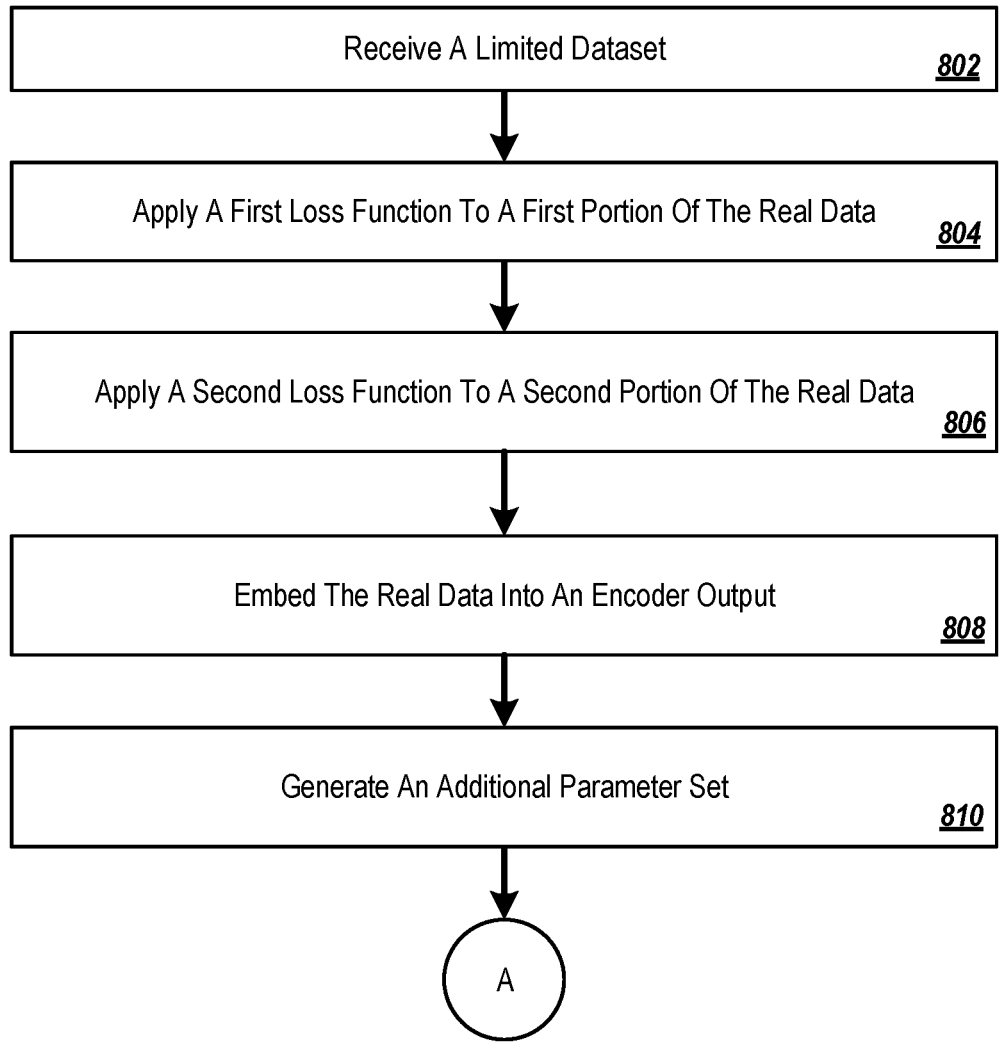
FIGS. 8A and 8B are a flow chart of an example method of generation text having two or more purposes.
Figure 8B:
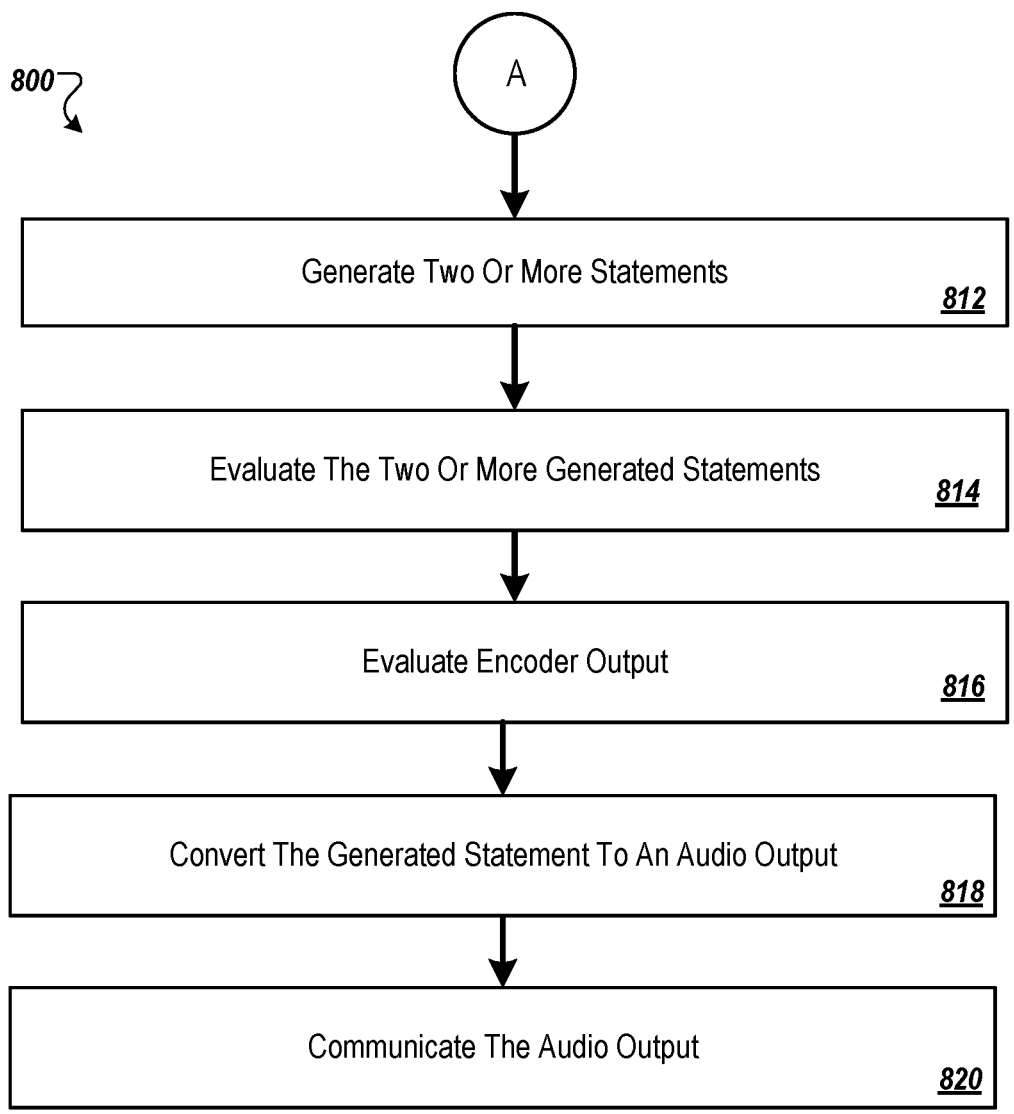

FIGS. 8A and 8B are a flowchart of an example method 800 of generating text having two or more related purposes according to at least one embodiment described in the present disclosure. The method 800 may be implemented using a generative adversarial network (GAN) such as the GAN 301 described above. The method 800 may be performed in an operating environment such as the operating environment 200 of FIG. 2. The method 800 may be programmably performed in some embodiments by the AI system 212 described with reference to FIG. 2. In some embodiments, the AI system 212 or another computing system may include or may be communicatively coupled to a non-transitory computer-readable medium (e.g., the memory 712 of FIG. 7) having stored thereon programming code or instructions that are executable by one or more processors (such as the processor 710 of FIG. 7) to cause a computing system and/or the AI system 212 to perform or control performance of the method 800. Additionally or alternatively, the AI system 212 may include the processor 710 described elsewhere in this disclosure that is configured to execute computer instructions to cause the AI system 212 or another computing system to perform or control performance of the method 800. Although illustrated as discrete blocks, various blocks in FIGS. 8A and 8B may be divided into additional blocks, combined into fewer blocks, or eliminated, depending on the desired implementation.

The method 800 may begin at block 802 in which a limited dataset may be received. The limited dataset may be received at an encoder in some embodiments. The limited dataset may include real data. The real data may have two or more cognitive value types. The cognitive value types may be related to one another. The real data may include a first portion and a second portion. The first portion of the real data may be identified as having a first cognitive value type of the cognitive value types. The second portion of the real data may be identified as having a second cognitive value type of the cognitive value types.

The first portion of the real data and/or the second portion of the real data may be manually identified. For instance, a linguist may manually identify the first portion and the second portion of the real data. In some embodiments, the limited dataset may include about 2000 sentence/user cases (e.g., about 2400 sentence/user cases) with fewer than about 100 unique reasons related to a particular decision output. In some embodiments, the particular decision output may describe an outcome regarding a loan application, an explanation concerning an information technology help desk, an explanation concerning an enterprise application, an explanation concerning a financial decision, some combination thereof, or another suitable application. In some embodiments, the cognitive value types may include only a first cognitive value type and a second cognitive value type. In these and other embodiments, the limited dataset may include pairs of explanations. A first explanation of each of the pairs of explanations may correspond to the first cognitive value type. A second explanation of each of the pairs of explanations may correspond to the second cognitive value type. The first explanation and the second explanation may both address a common issue identified in the real dataset. In some embodiments, the two cognitive values may include an educational value that may provide information related to a decision of an artificial intelligence (AI) system and an action value that provides instructional information intended to change the decision of the AI system.

At block 804, a first loss function may be applied to a first portion of the real data. The first loss function may be configured to ensure alignment of the first portion of the real data with the first cognitive value type. At block 806, a second loss function may be applied to a second portion of the real data. The second loss function may be configured to ensure alignment of the second portion of the real data with the second cognitive value type. At block 808, the real data may be embedded into an encoder output. The encoder output may include an embedded vector for one or more of the cognitive value types.

At block 810, an additional parameter set may be generated an The additional parameter set may be supplemental to the real data. The additional parameter set may be configured to enhance an expressiveness of a model. In some embodiments, the generating the additional parameter set may include modeling noise inputs as a mixture of Gaussians.

Referring to FIG. 8B, at block 812, two or more statements may be generated. The statements may be generated based on the additional parameter set and the encoder output. One or more of the statements may have a style of one of the cognitive value types. Additionally, the two or more statements may be related to a common issue addressed by the GAN such as the GAN 301 of FIG. 3. At block 814, the generated statements may be evaluated. The generated statements may be evaluated based on a comparison between the real data and the generated statements. In some embodiments, the evaluating the generated statements includes generating synthetic data output of a binary signal that is used by a generator to improve the two or more generated statements. At block 816, the encoder output may be evaluated. Based on an evaluation of the encoder output, an operation of the encoder may be altered. At block 818, the generated statements may be converted to an audio output. At block 820, the audio output may be communicated. For instance, the audio output may be communicated to an end user via a network-based application interaction.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 9A:
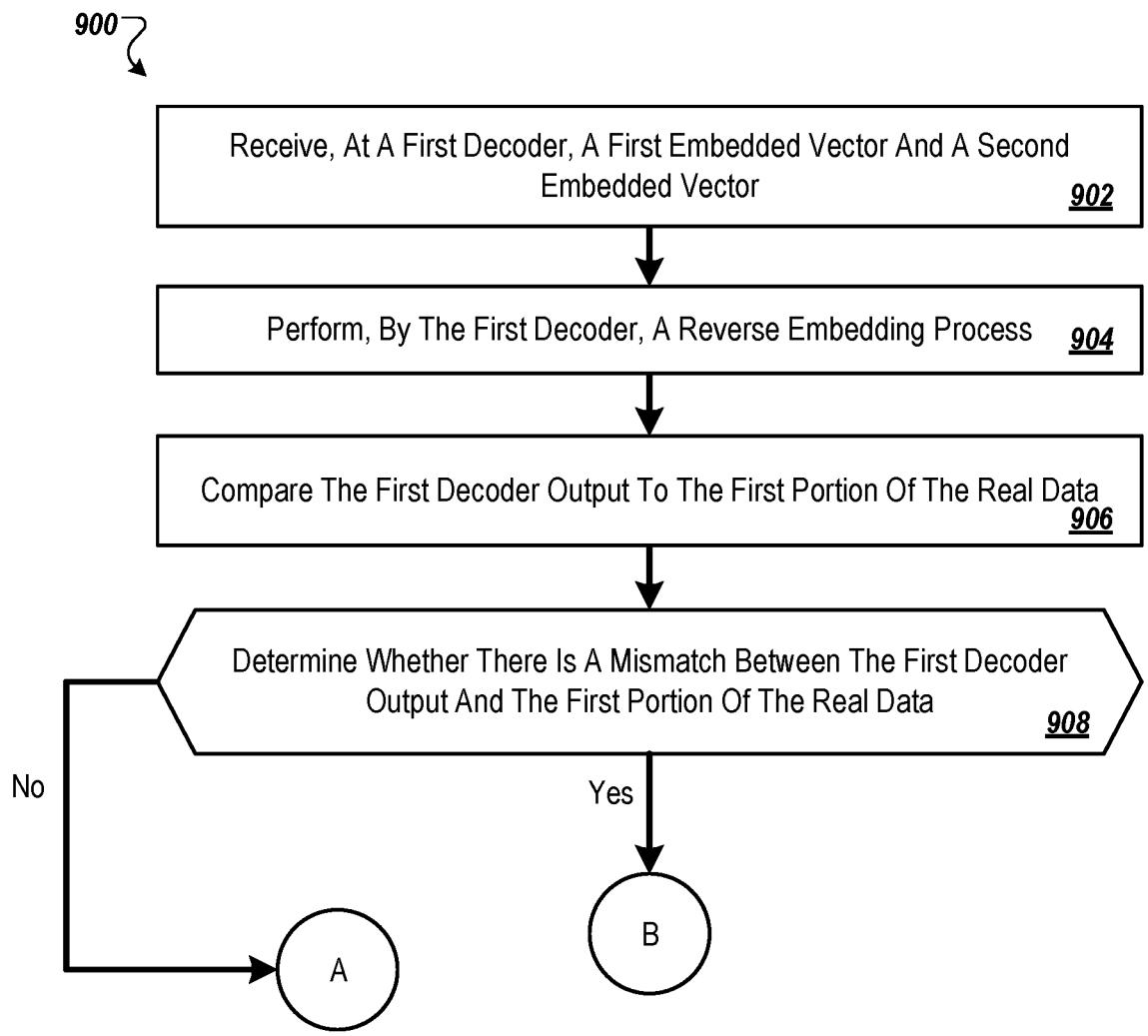
FIGS. 9A and 9B are a flow chart of an example encoder output evaluation method.
Figure 9B:
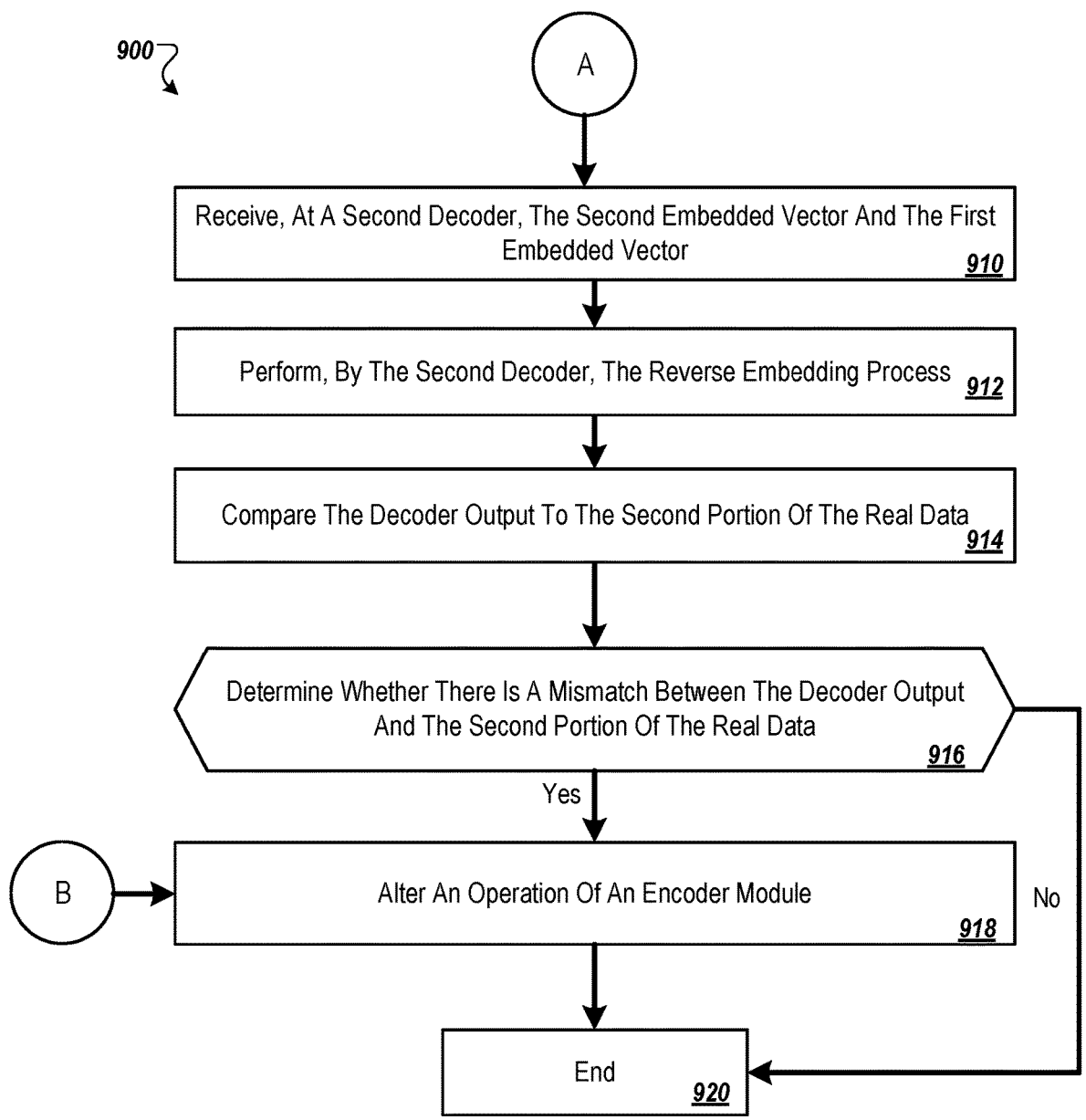

FIGS. 9A and 9B are a flowchart of an example method 900 of evaluating an encoder output according to at least one embodiment described in the present disclosure. The method 900 may be implemented using a generative adversarial network (GAN) such as the GAN 301 described above. The method 900 may be incorporated in another method or process. For instance, in some embodiments, the method 900 may be implemented as block 816 of the method 800.

The method 900 may be performed in an operating environment such as the operating environment 200 of FIG. 2. The method 900 may be programmably performed in some embodiments by the AI system 212 described with reference to FIG. 2. In some embodiments, the AI system 212 or another computing system may include or may be communicatively coupled to a non-transitory computer-readable medium (e.g., the memory 712 of FIG. 7) having stored thereon programming code or instructions that are executable by one or more processors (such as the processor 710 of FIG. 7) to cause a computing system and/or the AI system 212 to perform or control performance of the method 900. Additionally or alternatively, the AI system 212 may include the processor 710 described elsewhere in this disclosure that is configured to execute computer instructions to cause the AI system 212 or another computing system to perform or control performance of the method 900. Although illustrated as discrete blocks, various blocks in FIGS. 9A and 9B may be divided into additional blocks, combined into fewer blocks, or eliminated, depending on the desired implementation.

The method 900 may begin at block 902, in which a first embedded vector and a second embedded vector may be received. The first embedded vector and the second embedded vector may be received at a first decoder. The first embedded vector may correspond to a first portion of real data. The second embedded vector may correspond to a second portion of the real data. The first portion of the real data may be identified as having a first cognitive value type. The second portion of the real data may be identified as having a second cognitive value type.

At block 904, a reverse embedding process may be performed. The reverse embedding process may be performed to generate a first decoder output. At block 906, the first decoder output may be compared to the first portion of the real data. At block 908, it may be determined whether there is a mismatch between the first decoder output and the first portion of the real data.

Responsive to there being a mismatch between the first decoder output and the first portion of the real data ("YES" at block 908), the method 900 may proceed to block 918 of FIG. 9B. Responsive to there not being a mismatch between the first decoder output and the first portion of the real data ("NO" at block 908), the method 900 may proceed to block 910 of FIG. 9B. At block 910, the second embedded vector and the first embedded vector may be received. The second embedded vector and the first embedded vector may be received at a second decoder. At block 912, the reverse embedding process may be performed. The reverse embedding process may be performed to generate a second decoder output. At block 914, the second decoder output may be compared to the second portion of the real data. At block 916, it may be determined whether there is a mismatch between the second decoder output and the second portion of the real data.

Responsive to there being a mismatch between the second decoder output and the second portion of the real data ("YES" at block 916), the method 900 may proceed to block 918. At block 918, an operation of an encoder may be altered. Responsive to there not being a mismatch between the second decoder output and the second portion of the real data ("NO" at block 916), the method 900 may proceed to block 920 in which the method 900 may end.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of generating text having two or more related purposes using a generative adversarial network (GAN), the method comprising:
receiving a limited dataset that includes real data having two or more cognitive value types, the two or more cognitive value types being related to one another, wherein:
the limited dataset includes sets of explanations;
a first explanation of each of the sets of explanations corresponds to a first cognitive value type of two or more cognitive value types;
a second explanation of each of the sets of explanations corresponds to a second cognitive value type of the two or more cognitive value types; and
the first explanation and the second explanation both address a common issue identified in the real data;
applying a first loss function to a first portion of the real data, the first portion of the real data being identified as having the first cognitive value type, the first loss function being configured to ensure alignment of the first portion of the real data with the first cognitive value type;
applying a second loss function to a second portion of the real data, the second portion being identified as having a second cognitive value type of the two or more cognitive value types, the second loss function being configured to ensure alignment of the second portion of the real data with the second cognitive value type;
embedding the real data into an encoder output, the encoder output including an embedded vector for each of the two or more cognitive value types;
generating an additional parameter set, the additional parameter set being supplemental to the real data and configured to enhance an expressiveness of a model; and
generating two or more statements based on the additional parameter set and the encoder output, each of the two or more statements having a style of one of the two or more cognitive value types.

2. The method of claim 1, wherein:
the two or more cognitive value types includes only the first cognitive value type and the second cognitive value type; and
the limited dataset includes pairs of explanations.

3. The method of claim 1, further comprising:
receiving, at a decoder, a first embedded vector of the first cognitive value type and a second embedded vector of the second cognitive value type;
performing, by the decoder, a reverse embedding process relative to the first embedded vector and the second embedded vector to generate a decoder output;
comparing the decoder output to the first portion of the real data; and
responsive to a mismatch between the decoder output and the first portion of the real data, altering an operation of an encoder.

4. The method of claim 3, wherein:
the decoder is a first decoder of two decoders and the decoder output is a first decoder output of two decoder outputs; and
the method further comprises:
receiving, at a second decoder of the two decoders, the second embedded vector of the second cognitive value type and the first embedded vector of the first cognitive value type;
performing, by the second decoder, the reverse embedding process relative to the second embedded vector and the first embedded vector to generate a second decoder output;
comparing the second decoder output to the second portion of the real data; and
responsive to a mismatch between the second decoder output and the second portion of the real data, further altering another operation of the encoder.

5. The method of claim 1, wherein the two cognitive values include:
an educational value that provides information related to a decision of an artificial intelligence (AI) system; and
an action value that provides instructional information intended to change the decision of the AI system.

6. The method of claim 1, wherein the generating the additional parameter set includes modeling noise inputs as a mixture of Gaussians.

7. The method of claim 1, further comprising evaluating the two or more generated statements based on a comparison between the real data and the two or more generated statements, wherein the evaluating the generated statements includes generating synthetic data output of a binary signal that is used by a generator to improve the two or more generated statements.

8. The method of claim 1, wherein:
the limited dataset includes 1000-3000 sentence/user cases with fewer than 40-500 unique reasons related to a particular decision output; and
the first portion of the real data and the second portion of the real data are manually identified.

9. The method of claim 8, wherein the particular decision output describes:
an outcome regarding a loan application;
an explanation concerning an information technology help desk;
an explanation concerning an enterprise application; or
an explanation concerning a financial decision.

10. The method of claim 1, further comprising:
converting the two or more generated statements to an audio output; and
communicating the audio output to a user during a network-based application interaction.

11. A generative adversarial network (GAN) comprising:
an encoder configured to:
receive a limited dataset that includes real data having two or more cognitive value types, the two or more cognitive value types being related to one another, wherein:
the limited dataset includes sets of explanations;
a first explanation of each of the sets of explanations corresponds to a first cognitive value type of two or more cognitive value types;
a second explanation of each of the sets of explanations corresponds to a second cognitive value type of the two or more cognitive value types; and
the first explanation and the second explanation both address a common issue identified in the real data; and
embed the real data into an encoder output, the encoder output including an embedded vector for each of the two or more cognitive value types;
a first classifier configured to apply a first loss function to a first portion of the real data, the first portion of the real data being identified as having a first cognitive value type of the two or more cognitive value types, the first loss function being configured to ensure alignment of the first portion of the real data with the first cognitive value type;
a second classifier configured to apply a second loss function to a second portion of the real data, the second portion being identified as having a second cognitive value type of the two or more cognitive value types, the second loss function being configured to ensure alignment of the second portion of the real data with the second cognitive value type;
a noise model configured to generate an additional parameter set, the additional parameter set that is supplemental to the real data and configured to enhance an expressiveness of a model; and
a generator configured to generate two or more statements based on the additional parameter set and the encoder output, each of the two or more statements having a style of one of the two or more cognitive value types.

12. The GAN of claim 11, wherein:
the two or more cognitive value types includes only the first cognitive value type and the second cognitive value type; and
the limited dataset includes pairs of explanations.

13. The GAN of claim 11, further comprising a first decoder module that is configured to:
receive a first embedded vector of the first cognitive value type and a second embedded vector of the second cognitive value type;
perform a reverse embedding process relative to the first embedded vector and the second embedded vector to generate a decoder output;
compare the decoder output to the first portion of the real data; and
alter an operation of an encoder responsive to a mismatch between the decoder output and the first portion of the real data.

14. The GAN of claim 13, further comprising a second decoder module that is configured to:
receive the second embedded vector of the second cognitive value type and the first embedded vector of the first cognitive value type;
perform the reverse embedding process relative to the second embedded vector and the first embedded vector to generate a second decoder output;
compare the second decoder output to the second portion of the real data; and
alter another operation of the encoder responsive to a mismatch between the second decoder output and the second portion of the real data.

15. The GAN of claim 11, wherein the two cognitive values include:
an educational value that provides information related to a decision of an artificial intelligence (AI) system; and
an action value that provides instructional information intended to change the decision of the AI system.

16. The GAN of claim 11, wherein the generating the additional parameter set includes modeling noise inputs as a mixture of Gaussians.

17. The GAN of claim 11, further comprising a discriminator that is configured to:
evaluate the generated statements based on a comparison between the real data and the additional parameter set; and
generate synthetic data output of a binary signal that is used by the generator to modify generated statements.

18. The GAN of claim 11, wherein:
the limited dataset includes 1000-3000 sentence/user cases with fewer than 40-500 unique reasons related to a particular decision output; and
the first portion of the real data and the second portion of the real data are manually identified.

19. The GAN of claim 18, wherein the particular decision output describes:
an outcome regarding a loan application;
an explanation concerning an information technology help desk;
an explanation concerning an enterprise application; or
an explanation concerning a financial decision.

20. The GAN of claim 11, further comprising a text-to-voice generator that is configured to:
  convert the two or more generated statements to an audio output; and
  communicate the audio output to a user during a network-based application interaction.

\* \* \* \* \*